R. S. BRYANT.
RIM FOR VEHICLE WHEELS.
APPLICATION FILED SEPT. 5, 1913.

1,125,456.

Patented Jan. 19, 1915.

Witnesses
Inventor
Richard S Bryant
By Hull & Smith
Attys.

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,125,456.  Specification of Letters Patent.  Patented Jan. 19, 1915.

Application filed September 5, 1913. Serial No. 788,304.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and particularly to a device whereby a tire carrying rim of the demountable type may be secured in place about the wheel felly.

Within recent years it has become the prevailing method to provide each vehicle with an extra rim equipped with a suitable tire, the tire being maintained in such condition as to be ready to use immediately in case of emergency and the wheel being constructed so as to permit the rapid and convenient substitution of the new rim and tire for the rim and tire already in place thereon. In order to maintain the rim in place about the felly, it has long been customary to interpose a sort of wedging means between the two and to draw the same laterally into the annular space provided therebetween so as to center the rim accurately about the felly and maintain it rigidly in position. Also within recent years, it has been customary to employ a discontinuous ring of some nature for effecting this wedging, owing to the fact that the ring supports and reinforces the rim at all points. This ring is necessarily a discontinuous one in order to permit for the necessary contraction and expansion of the same, wherefore its meeting ends have frequently been left spaced apart, allowing the entrance of water, sand, and other foreign matter, while the removal of such a ring has sometimes been the matter of considerable difficulty, particularly in case the parts had remained in contact a long time so as to become rusted together, this difficulty being particularly pronounced in case the inner surface of the ring and the coöperating surface of the felly were cylindrical.

Accordingly, the object of this invention is the provision of means for preventing the admission of foreign matter between the ends of the ring; the provision of means whereby the ends of the ring may be maintained in strict alinement so as to support the rim uniformly; the provision of means whereby the ring can be easily grasped for purposes of removal; and further objects and advantages will appear as the description proceeds.

Figure 1:
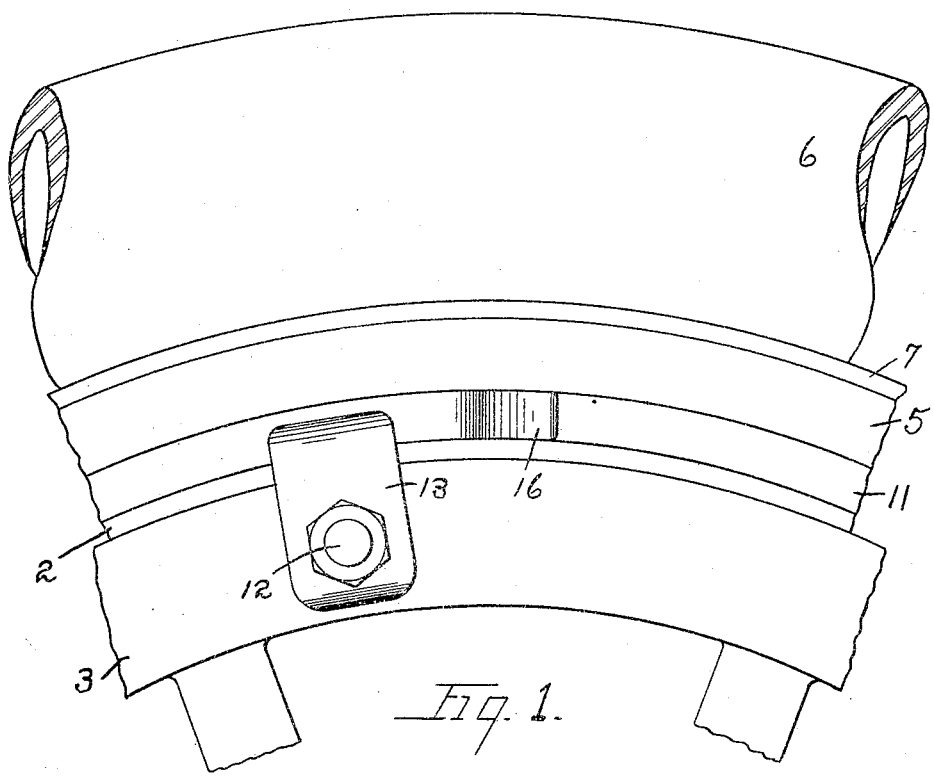
Figures 2, 3:
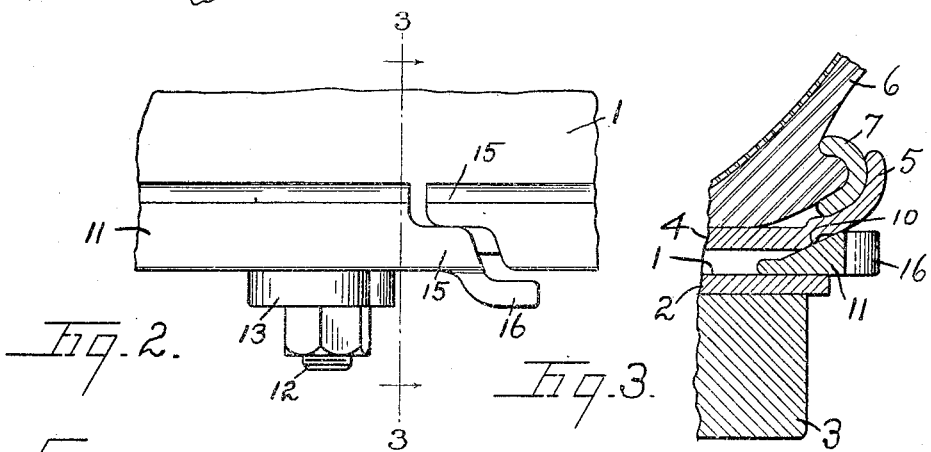

Generally speaking, my invention may be defined as consisting of the combinations and constructions defined in the claims hereto annexed and illustrated in the drawings accompanying and forming part of this specification, wherein, Figure 1 is a side elevational view of a portion of the vehicle wheel constructed in accordance with my invention; Fig. 2 is a plan view of a portion of the wheel felly, or rather felly band and wedge ring showing the meeting ends of the latter; and Fig. 3 is a transverse cross sectional view taken upon the line 3—3 of Fig. 2 and looking in the direction of the arrows.

For purposes of this invention, the wheel may be divided up into a body or circular member, a rim adapted to surround the same and detachably connected thereto, and securing means whereby the rim is secured to the circular member or body. The circular member or body is generally provided with a substantially cylindrical outer face 1, here formed by a metallic felly band 2, shrunk around the periphery of the felly 3, although it will be understood that any suitable or desirable construction of wheel body could be employed within the limits of this invention. The demountable rim is shown at 4, and comprises a metal ring or hoop having its edges laterally outturned as at 5 so as to engage and secure the side walls of the tire 6. In the present case, the securing of the tire is effected through the medium of separate side rings 7, although it will be understood that any suitable or desirable form of rim could be employed within the limits of this invention.

At the side of the wheel the adjacent faces of the circular member and rim are formed so as to diverge from each other so as to form a wedge receiving recess. In the present instance, the circular member is made cylindrical out to the very edge, while the lateral portion of the rim is flared as shown at 10, although it is obvious that other arrangements could be employed to secure the same results. In the annular space between the rim and circular member is interposed a wedge ring 11 having its opposite faces shaped complementarily to the faces of said rim and circular member, and suitable means such as bolts 12 and clips 13 are provided whereby this ring may be shifted laterally into wedging engagement with the parts between which it is introduced. In order to allow for necessary expansion and contraction this ring is made discontinuous, the abutting ends of the ring preferably being halved together as shown in Fig. 2, so as to form a kind of scarf joint, each end being formed with a projecting tongue extending into a corresponding recess formed in the other end, the sides of the tongues being formed parallel to the plane of the ring, and the width of the tongues being such as to maintain the edges of the ring in substantial alinement. The clip 13 being applied to the end of the ring which has the outermost tongue it will be obvious that the ends of the ring will be forced into place simultaneously and without relative disalinement.

One end of the ring, preferably the end having the outermost tongue, is formed at its outer edge with an extension 16 adapted to overlie slightly the opposite end of the ring, and spaced therefrom a sufficient distance to permit the insertion of a prying tool such as the blade of a screw-driver. When arranged as illustrated in these drawings, this extension serves further to cover and protect the joint between the ends of the ring, while falling as it does within the edge of the rim 4 and within the line of the clips 13, it is relatively inconspicuous and is shielded from harm. The width of the wedge ring and the amount of lateral displacement of the extension 15 is such that it is always possible to introduce a tool therebetween without interference from the edge of the circular member. The opposite edge of the rim (not shown) may be supported and spaced away from the circular member in any suitable manner, as will be well understood.

While I have described my improvements as employed in connection with a ring having a cylindrical interior and a tapered exterior it is obvious that they could be employed with rings wherein the cylindrical and tapered portions were otherwise arranged, although my improvements offer particular advantages in connection with the arrangement shown because of the unusual difficulty of removing the ring. Also while I have described my invention in the embodiment which at present has commended itself to be the most satisfactory, it will be obvious that changes therein may be made within the terms of the annexed claims.

Having thus described my invention, what I claim is—

1. A wedge ring of the type adapted to be interposed between the rim and circular member of a vehicle wheel, said ring being discontinuous and having adjacent to its joint a laterally spaced extension adapted for coöperation with a prying tool.

2. A wedge ring of the type adapted to be interposed between the rim and circular member of a vehicle wheel, said ring being discontinuous and having its ends formed to overlie each other laterally, one of said ends being formed with a laterally spaced extension adapted for coöperation with a prying tool.

3. A wedge ring of the type adapted to be interposed between the rim and circular member of a vehicle wheel, said ring being discontinuous and having its ends formed to overlie each other laterally, one of said ends being formed with a laterally spaced extension adapted to define a tool receiving recess, said extension being displaced laterally a sufficient distance to overhang the edge of the circular member even when the ring is fully seated.

4. A wedge ring adapted to be interposed between the rim and circular member of a vehicle wheel, said ring being discontinuous and having its ends halved together to form a scarf joint, each of said ends being formed with a recess and a projection with the projection of one end extending into the recess of the opposite end, and the projection at the wider edge of the ring being formed with a laterally spaced extension for the reception of a prying tool.

In testimony whereof, I hereunto affix my signature in the presence of two witnesses.

RICHARD S. BRYANT.

Witnesses:
  HAROLD E. SMITH,
  J. B. HULL.